(12) United States Patent
Matsumura et al.

(10) Patent No.: US 7,357,005 B2
(45) Date of Patent: Apr. 15, 2008

(54) FIBER OPTIC COLLIMATOR SYSTEM, FIBER OPTIC COLLIMATOR ARRAY, AND MANUFACTURING METHOD OF THE FIBER OPTIC COLLIMATOR SYSTEM AND FIBER OPTIC COLLIMATOR ARRAY SYSTEM

(75) Inventors: Hiroyoshi Matsumura, Saitama (JP); Taro Suzuki, Tokyo (JP); Toru Achiwa, Tokyo (JP)

(73) Assignee: Toyo Glass Co., Ltd., Tokyo (JP)

( * ) Notice: Subject to any disclaimer, the term of this patent is extended or adjusted under 35 U.S.C. 154(b) by 0 days.

(21) Appl. No.: 10/569,278

(22) PCT Filed: Apr. 5, 2005

(86) PCT No.: PCT/JP2005/006638

§ 371 (c)(1),
(2), (4) Date: Nov. 15, 2006

(87) PCT Pub. No.: WO2006/109348

PCT Pub. Date: Oct. 14, 2006

(65) Prior Publication Data

US 2007/0147733 A1 Jun. 28, 2007

(51) Int. Cl.
*C03B 37/00* (2006.01)
*G02B 6/38* (2006.01)

(52) U.S. Cl. ............... 65/387; 65/406; 65/407; 385/33; 385/34; 385/52; 385/74

(58) Field of Classification Search ........... 385/31, 385/33, 34, 95, 96, 97, 98, 99, 53, 70, 71, 385/72; 65/385, 387, 406, 407
See application file for complete search history.

(56) References Cited

U.S. PATENT DOCUMENTS

| | | | | | |
|---|---|---|---|---|---|
| 4,962,988 | A | * | 10/1990 | Swann | ............. 385/34 |
| 5,384,874 | A | * | 1/1995 | Hirai et al. | ............. 385/34 |
| 5,757,993 | A | * | 5/1998 | Abe | ............. 385/34 |
| 6,174,828 | B1 | * | 1/2001 | Morita et al. | ............. 501/12 |
| 6,831,791 | B2 | * | 12/2004 | Namiki et al. | ............. 359/652 |
| 2002/0168140 | A1 | | 11/2002 | Asano et al. | ............. 385/34 |
| 2004/0096153 | A1 | * | 5/2004 | Fukuzawa | ............. 385/34 |
| 2004/0137236 | A1 | * | 7/2004 | Namiki et al. | ............. 428/432 |
| 2007/0147733 | A1 | * | 6/2007 | Matsumura et al. | ............. 385/34 |

FOREIGN PATENT DOCUMENTS

| JP | 2002-372604 | 12/2002 | ......... 385/34 X |
|---|---|---|---|
| JP | 2004-219554 | 8/2004 | ......... 385/34 X |
| JP | 2004-302292 | 10/2004 | ......... 385/34 X |

* cited by examiner

*Primary Examiner*—Brian M. Healy
(74) *Attorney, Agent, or Firm*—Wenderoth, Lind & Ponack, L.L.P.

(57) ABSTRACT

A fiber optic collimator system, a fiber optic collimator array, and a fiber optic collimator array system, which can reduce difficulty in an alignment process, minimize a coupling loss, and prevent the optical characteristics from deteriorating. An optical fiber is fused to one end of a GRIN lens made of quartz glass containing one or more selected from $Sb_2O_3$, $Ta_2O_5$, $TiO_2$ and $ZrO_2$ as a refractive index regulating substance, to form an optical fiber with a GRIN lens. Since an adhesive is not used, the core alignment of the GRIN lens and the optical fiber can be facilitated by a self alignment effect without deteriorating the optical characteristics. Moreover, the coupling loss is remarkably reduced by appropriately setting a refractive index distribution constant g of the GRIN lens. By fabricating the fiber optic collimator system, the fiber optic collimator array, the fiber optic collimator array system using the optical fiber with a GRIN lens can reduce the difficulty in the core alignment process, minimize the coupling loss, and prevent the optical characteristics from deteriorating.

4 Claims, 13 Drawing Sheets

FIBER OPTIC COLLIMATOR SYSTEM, FIBER OPTIC COLLIMATOR ARRAY, AND MANUFACTURING METHOD OF THE FIBER OPTIC COLLIMATOR SYSTEM AND FIBER OPTIC COLLIMATOR ARRAY SYSTEM

BACKGROUND OF THE INVENTION

1. Technical Field

The present invention relates to a fiber optic collimator system that disposes optical fibers with GRIN lenses being opposingly arranged and holding arbitrary optical elements, a fiber optic collimator array comprising a plurality of optical fibers with GRIN lenses being positioned in parallel, a method of manufacturing the fiber optic collimator system, and a method of manufacturing the fiber optic collimator array system that disposes the fiber optic collimator arrays in an opposed arrangement.

2. Description of the Related Art

In conventional optical information transmission, an outgoing light which is a light emerged from one optical fiber, is converted to a parallel light by a collimator lens. The parallel light after propagation is collected by another collimator lens, and is input to another optical fiber. Such an optical system is called a "collimator system" whereby a diverse optical module can be constructed by inserting various optical elements such as a filter, an optical isolator element, an optical switch, an optical modulator, or the like, between the collimator lenses. A convex lens is typically used as the collimator lens. However, a cylindrical graded index lens (hereinafter referred to as "GRIN lens") is used to facilitate the installation. As shown in FIG. 1, when a refractive index n of the GRIN lens, as viewed from its cross-sectional direction x, y, is defined in the following equation (1), the GRIN lens shows the maximum refractive index at a cylindrical core axis. The refractive index decreases continuously in a second degree curve as being directed away from the core toward the peripheral direction. A lens effect is carried out according to this refractive index distribution.

$$n = n_0\{1 - g^2 r^2/2\} \quad (1)$$

wherein reference character g denotes a constant showing a light-collecting ability of the GRIN lens, $n_0$ denotes a refractive index of a material of the GRIN lens, and r denotes a distance ($r^2 = x^2 + y^2$) in a radial direction.

As shown in FIG. 1, provided that a radius of the GRIN lens is a, and a refractive index of the GRIN lens at the radius a is $n_a$, the following is defined:

$$g = NA/an_0 \quad (2) \text{ wherein } NA = (n_0^2 - n_a^2)^{1/2}$$

Here, reference character NA denotes a square root of a second power of a difference in the refractive indices of the GRIN lens at the core and the surrounding, which is termed a numerical aperture (hereinafter referred to as "NA"), which is an important parameter for representing the lens performance. The lens having a high NA is the lens having a high light-collecting ability, that is, the lens with an excellent lens property. A length (L) of the GRIN lens used as the collimator lens is set to a quarter length of the meander cycle of propagation light that propagates inside the GRIN lens, or set to its odd multiple. Provided that $L_{1/4}$ is the quarter meandering wavelength, the following is defined;

$$L_{1/4} = \pi/(2g) \quad (3)$$

wherein the length L of the GRIN lens is set as a quarter length of the meander cycle of propagation light shown in the equation (3) or set as its odd multiple, if a space between the opposing collimator lens is short. If the space becomes long, the length is typically set to be slightly longer than $L_{1/4}$ to improve on a coupling loss. Hereinafter the case in which the space in between the collimator lens is short, will be explained.

FIG. 2 is a perspective view showing a single core collimator system having a pair of the GRIN lens 1a and 1b, which are opposingly arranged. The optical fibers 2a and 2b are connected to the GRIN lenses 1a and 1b at the end faces opposite to the facing planes by making the optical axes coincide. An optical signal transmission is carried out by outputting a light from one of the optical fiber 2a to the GRIN lens 1a connected thereto as a parallel light, collecting the parallel light at the other GRIN lens 1b, and introducing the light into the optical fiber 2b connected thereto. Consequently, in the collimator system using such GRIN lenses 1a and 1b, the optical axes of the opposing GRIN lenses 1a and 1b must precisely coincide, as well as the optical axes of the GRIN lenses 1a and 1b and the optical axes of the optical fibers 2a and 2b, to reduce the coupling loss.

FIG. 3 is a schematic perspective and explanatory view showing the fiber optic collimator array system in which a pair of the optical fiber collimator arrays 1 are opposingly arranged. In between both the fiber optic collimator arrays 1, two-staged MEMS-type (micro electromechanical systems) optical switch arrays 3 having 2 degrees of freedom are inserted. At end faces located opposite of the facing plane of each of the GRIN lenses for each of the fiber optic collimator arrays 1, the optical fibers 2a and 2b are connected by making the optical axes coincide so as to construct the optical fiber arrays 2 which are a group of these optical fibers. An optical signal transmission is carried out by outputting a light from each optical fiber 2a at one end, which is converted to a parallel light at the GRIN lens 1a connected thereto, reflecting two times at the optical switches 3a and 3b of the optical switch arrays 3, changing a direction of the parallel light by changing a reflection angle, collecting the parallel light at each GRIN lens 1b at the other end, and introducing it into the optical fiber 2b connected thereto. An optical path of the light is switched by appropriately changing the reflection angles of micro-mirrors 3c having 2 degrees of freedom comprised of two-staged MEMS-type optical switch arrays 3. Consequently, in such a collimator system, the optical axes of the opposing GRIN lenses 1a and 1b must precisely coincide respectively, as well as the optical axes of each of the GRIN lenses 1a and each of the optical fibers 2a, to reduce the coupling loss.

Here, FIG. 4 shows an actual example of a single core collimator system loading the optical isolator element. The industry-wide standard for an optical fiber core wire 7 is 0.9 mm. This optical fiber core wire 7 with built-in GRIN lens 1a and optical fiber 2a of 1.8 mm is inserted, adhered, and fixed to both ends of the optical fiber lens holder (metal) 8 of a concentric circle which is controlled to an outer dimension of 3 mm and inner diameters of 1.8 mm and 0.9 mm. The core wire 7 is made by covering the optical fibers 2a and 2b with a plastic and the like. Because the precision in the optical axis alignment of the optical fiber 2a and the GRIN lens 1a is influenced by the processing precision of the inner diameters of the optical fiber lens holder 8 of the concentric circle, a high level of processing precision is demanded. The optical fiber lens holder 8 is inserted into a collimator holder (metal) 9 controlled to the outer dimension of 10 mm and the inner diameter of 3 mm, and fixed to the collimator holder 9 by a fixing flange 11. Because the optical axis alignment of the single core collimator system facing each other accordingly is influenced by the processing precision of the inner diameter of the collimator holder 9 and the outer dimension and inner diameters of the optical fiber lens holder 8, a high level of processing precision is demanded. In the single core collimator systems which are opposingly arranged like this, the light that is output from the optical fiber 2a is collected at the GRIN lens 1a, which is output as approximately a parallel light 6. The substantially parallel light 6 is collected at the GRIN lens 1b at another end, and input to the optical fiber 2b. The collimator system functions accordingly. Various optical elements 10, such as an optical isolator component of the present example, are included and fixed between the opposing pair of collimator systems.

However, there are typically problems that occur such as processing precision of the devices and alignment precision from the point of view of the production technology (in the example of FIG. 4, processing precision of various holders 8 and 9, and tolerance precision of the optical fiber core wire and the GRIN lens 1a), including axial displacements in various directions when the GRIN lenses 1a and 1b are disposed so as to face each other as shown in FIG. 4. As shown in FIG. 2, the ideal optical axis is expressed by a letter C which is common to the GRIN lenses 1a and 1b, and the optical fibers 2a and 2b. When the Z direction is defined as a direction parallel to the optical axis C, the X direction is defined as a direction perpendicular to the horizontal direction, and the Y direction is defined as a direction perpendicular to the vertical direction, as the possible axis displacements between the facing lens, there occurs a displacement in the X direction, an inclination angle in the X direction θx, a displacement in the Y direction, and an inclination angle in the Y direction θy.

Moreover, as shown in FIG. 3, in the case of the fiber optic collimator array system in which two-staged MEMS-type (micro electromechanical systems) optical switch arrays 3 having 2 degrees of freedom are inserted between the two fiber optic collimator arrays 1 and 1, an optical path of the light can be switched by appropriately changing the reflection angles of the micro-mirrors 3c having 2 degrees of freedom comprised of the two-staged MEMS-type optical switch arrays 3. However, the mirror angles of each of the micro-mirrors 3c inside the optical switch array are not all equal and will vary slightly. For this reason, even if the core between the fiber optic collimator arrays 1 is aligned perfectly, the mirror angle displacements inside the optical switch array may generate the optical axis displacements by that amount of variance. Thus, the MEMS-type optical fiber collimator array system typically generates a large axial displacement in comparison to the single core collimator system in which the pair of GRIN lens 1a and 1b, shown in FIG. 2, are ordinarily arranged so as to oppose each other.

Normally, a GRIN lens and an optical fiber are connected by using an adhesive. Adhesives such as that disclosed in U.S. Pat. No. 4,213,677 are used to fix the optical fiber and the GRIN lens. In this configuration, when a highly intensive light is input from an optical absorption of the adhesive, the optical characteristics deteriorate due to an alteration of the adhesive caused by the elevated temperature. In general, under the wavelength region used in optical communication, the optical adhesive has an absorption ranging from 1 to 5%, and an alteration temperature of about 400° C. at maximum. The adhesive fails to tolerate the light intensity of a several Watts class for the physical property of this range. Moreover, there are many factors that will deteriorate a yield of the product when the optical fiber and the GRIN lens are spliced by the adhesive, such as angle displacements, optical axis displacements, air bubbles caused by including air in the adhesive, and an increased light reflection at a connecting surface, thus it causes a problem of increased cost. Moreover, four optical axes including each one of the GRIN lenses and each one of the optical fibers must coincide precisely, and thus the implementation is expensive.

To solve the above-mentioned problems, as disclosed in U.S. Pat. Nos. 4,701,011 and 5,384,874, a structure adopting a GI (graded-index) optical fiber as the collimator lens has been proposed. The GI optical fiber is an optical fiber with a radially varying refractive index at the core. The GI optical fiber is made of quartz, which is the same as the material forming the optical fiber, which allows it to be fused and spliced to the optical fiber, and the tolerance against the highly intensive light is expected to be obtained. In this case, the normal GI optical fiber is formed by a chemical vapor deposition method. In the chemical vapor deposition, NA=0.38 is obtained (for example, refer to literature by P. B. O'Connor et al: Electron. Lett., 13 (1977) 170-171). However, when an amount of additives (such as $GeO_2$, $P_2O_5$) is increased in order to obtain a higher NA than the above value, this GI optical fiber is practically poor in handling upon fabricating the collimator lens in terms of matching the thermal expansion property, such that the parent material is liable to crack by an increase of the thermal expansion coefficient, and in terms of controllability of the refractive index, such as being unable to obtain the higher NA.

Patent Document 1: U.S. Pat. No. 4,213,677

Patent Document 2: U.S. Pat. No. 4,701,011

Patent Document 3: U.S. Pat. No. 5,384,874

SUMMARY OF THE INVENTION

As described above, conventionally, subtle and complicated core alignment processing has been required in various axial directions. The present invention was accomplished in consideration of such circumstances, and has as its object to provide a fiber optic collimator system and a fiber optic collimator array system that can reduce the difficulty in the core alignment processing, minimize the coupling loss, and prevent the optical characteristics from deteriorating. The present invention also has as its object to provide a method for efficiently producing the fiber optic collimator system and the fiber optic collimator array system that can minimize the coupling loss.

MEANS TO SOLVE THE PROBLEM

The present invention is a fiber optic collimator system which is characterized in that an optical fiber is fused to one end of the GRIN lens (Graded Index Lens) made of quartz glass containing one or more selected from $Sb_2O_3$, $Ta_2O_5$, $TiO_2$ and $ZrO_2$ as a refractive index regulating substance, and a part of optical fibers with GRIN lenses are integrated by facing the end faces of the GRIN lens, and also that an optical element is provided between the end faces of the GRIN lens.

The present invention is also a fiber optic collimator system which is characterized in that an optical fiber with a GRIN lens is fused to one end of the GRIN lens made of quartz glass including one type and more selected from $Ta_2O_5$, and $TiO_2$ as a refractive index regulating substance, and a pair of the optical fibers with GRIN lenses are integrated by facing the end faces of the GRIN lens, and that an optical element is provided between the end faces of the GRIN lens.

The present invention is also the fiber optic collimator system is also characterized in that the GRIN lens is manufactured by a sol-gel method.

The present invention is also a fiber optic collimator array which is characterized in that an optical fiber with a GRIN lens is fused to one end of the GRIN lens (Graded Index Lens) made of quartz glass containing one or more selected from $Sb_2O_3$, $Ta_2O_5$, $TiO_2$ and $ZrO_2$ as a refractive index regulating substance, and a plurality of optical fibers with GRIN lenses are integrated by aligning the GRIN lens portions in parallel.

The present invention is also a fiber optic collimator array which is characterized in that an optical fiber with a GRIN lens is fused to one end of the GRIN lens made of quartz glass containing one or more selected from $Ta_2O_5$, and $TiO_2$ as a refractive index regulating substance, and a plurality of optical fibers with GRIN lenses are integrated by aligning the GRIN lens portions in parallel.

The present invention is also the fiber optic collimator array which is characterized in that the GRIN lens is manufactured by a sol-gel method.

The present invention is also directed to a method of manufacturing a fiber optic collimator system which comprises:

a step for trial-producing a plurality of optical fiber collimator systems;

a step for measuring a horizontal position displacement and an inclination angle for a pair of the GRIN lenses of the plural optical fiber collimator systems trial-produced;

a step for setting a targeted yield and a targeted coupling loss;

a step for checking the horizontal position displacement and the inclination angle against the targeted yield to obtain a permitted horizontal position displacement and a permitted inclination angle;

a step for calculating an numerical aperture of a GRIN lens based on the permitted horizontal position displacement and the permitted inclination angle; and a step for producing the optical fiber collimator system by using the GRIN lens having a numerical aperture which is larger than the numerical aperture calculated.

Also, the present invention is a manufacturing method of the optic collimator array system, wherein a pair of the optical fiber collimator arrays are directly facing each other or facing each other via a mirror. The method includes:

a step for trial-producing a plurality of optical fiber collimator array systems;

a step for measuring a horizontal position displacement and an inclination angle for each of the GRIN lens to which a plurality of the trial-produced optical fiber collimator array systems correspond;

a step for setting a targeted yield and a targeted coupling loss;

a step for checking the horizontal position displacement and the inclination angle against the targeted yield to obtain a permitted horizontal position displacement and a permitted inclination angle;

a step for calculating an numerical aperture of a GRIN lens based on the permitted horizontal position displacement and the permitted inclination angle; and a step for producing the optical fiber collimator array system by using the GRIN lens having a numerical aperture being larger than the numerical aperture calculated.

EFFECTS OF THE INVENTION

According to the fiber optic collimator system and the fiber optic collimator array system of the present invention, since the GRIN lens and the optical fiber being already spliced are employed, an axial alignment of the lens and the optical fiber is not required in the assembling process, and accordingly the systems can be efficiently fabricated. Further, since the GRIN lens and the optical fiber are fused and spliced, the axes of the GRIN lens and the optical fiber automatically coincide due to a self alignment effect caused by surface tension in fusing. Thus, the production is remarkably facilitated and mass production is also possible. Moreover, since the adhesive is not used, even if a highly intensive light is input, the problem of deterioration in the optical characteristics caused by alteration of the adhesive due to the elevated temperature does not occur.

According to the fiber optic collimator system of the present invention, trends of the horizontal position displacements and the inclination angles are examined for a plurality of trial products. Based on this result, the permitted amount of horizontal position displacement, and the permitted inclination angle, can be obtained to attain a targeted yield and a targeted coupling loss. A minimum value of the NA required for the GRIN lens can be obtained from the permitted amount of horizontal position displacement and the permitted inclination angle. Thus, the targeted yield and the targeted coupling loss can be attained efficiently at low costs, without using a GRIN lens with a larger NA than necessary.

According to the fiber optic collimator array system, as well as the above-mentioned fiber optic collimator system, trends of the horizontal position displacements and the inclination angles are examined for a plurality of trial products. Based on this result, the permitted amount of horizontal position displacement, and the permitted inclination angle can be obtained to attain a targeted yield and a targeted coupling loss. A minimum value of the NA required for the GRIN lens can be obtained from the permitted amount of horizontal position displacement and the permitted inclination angle. Thus, the targeted yield and the targeted coupling loss can be attained efficiently at low costs without using a GRIN lens with a larger NA than necessary.

EXPLANATION OF THE REFERENCE NUMERALS

Figure 1:
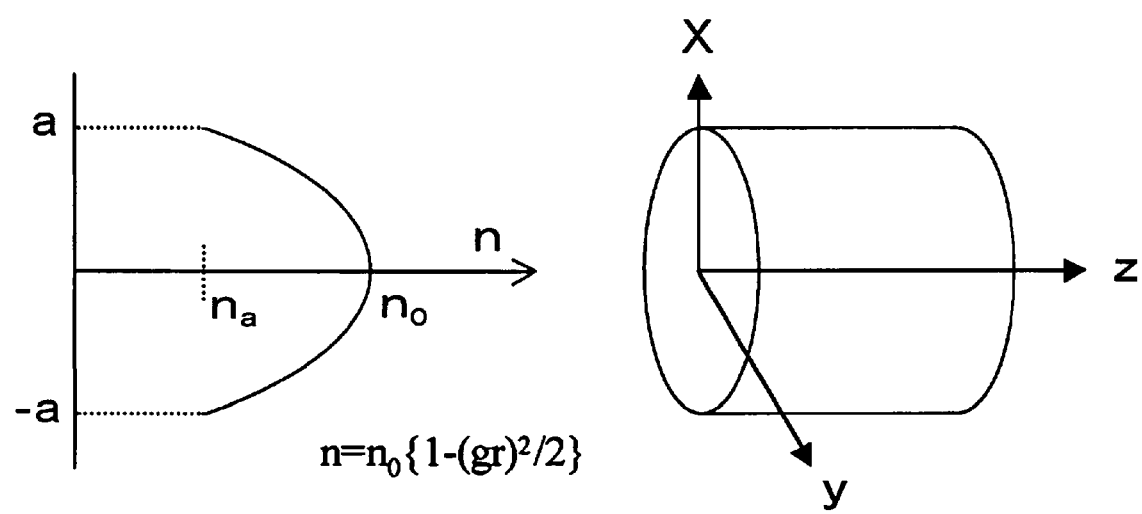
FIG. 1 is an explanatory drawing of the refractive index distribution of the GRIN lens.
Figure 2:
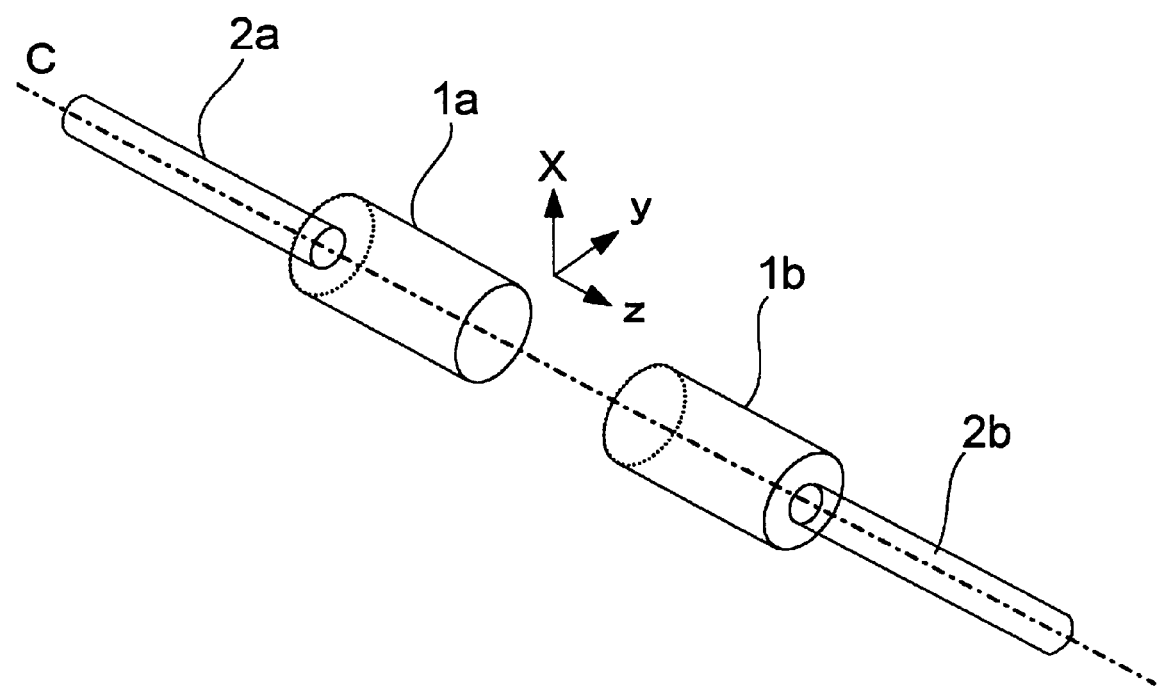
FIG. 2 is a perspective view of the collimator system.

1 Fiber optic collimator array
1a GRIN lens
1b GRIN lens
2 Fiber optic array
2a Optical fiber
2b Optical fiber
3 Optical switch array
3a Optical switch
3b Optical switch
3c Micro-mirrors
6 Parallel Gaussian beam
7 Optical fiber core wire
8 Optical fiber lens holder
9 Collimator holder
10 Optical element
11 Fixing flange
12 Board
13 V-groove
14 Frame

DETAILED DESCRIPTION OF THE INVENTION

The GRIN lens having a thermal expansion coefficient substantially equivalent to that of an optical fiber made of quartz glass can be produced by a sol gel method which is based on the low temperature synthesis. According to the sol gel method, $Si(OR)_4$ (where R is the alkyl group) as a starting material and an alkoxide of an additive element such as titanium are prepared. $H_2O$ for hydrolysis and alcohol for compatibility of the starting materials with hydrolysis are added to the starting material and mixed therewith. Then, emulsion (sol state) of $SiO_2$ fine particles formed as the hydrolysis progresses is observed, a viscosity of the solution is rapidly increased, the fluidity is lost, and a pudding-like gel state appears. This gel is dried, the remaining alcohol and $H_2O$ adhered on a surface are gradually removed to form a sintered glass. The glass synthesis employing this sol gel method has the following characteristics: (1) reduction in frequency of crystallization to be caused by low temperature sintering; (2) synthesis of homogeneous glass at a molecular level; (3) wide selection of materials including material with a high melting point; and (4) possibility of reduction in the production cost based on a high yield in synthesis of materials. By using the sol gel process having these characteristics, the GRIN lens having high NA with excellent controllability of the refractive index and a thermal expansion coefficient substantially equivalent to that of the quartz glass can be formed at an inexpensive cost.

Now, the refractive indices of the binary silicate glasses were estimated, it was found that examples of the candidates for the GRIN lens compositions includes $SiO_2$—$Bi_2O_3$, —$In_2O_3$, —$Y_2O_3$, —$La_2O_3$, —$Ga_3O_2$, —$Sb_2O_3$, —$Gd_2O_3$, —$Nb_2O_5$, —$SnO_2$, —$Ta_2O_5$, —$TiO_2$, and —$ZrO_2$ system quartz glasses. Among these, the gel was not formed for the compositions containing Bi, In, Y, and La because alkoxides of the additive elements are all insoluble solid. Moreover, as for the compositions containing Gd and Ga, the gel was obtained only within a region of small additives (when the additive amount is 20 mol % and less with respect to Si). Moreover, Nb, Sn added glasses were not suitable for a GRIN lens because the existence of the crystalline substances has been recognized and because the thermal expansion coefficients were large. From the result of this experiment, it was found that $SiO_2$—$Sb_2O_3$, $SiO_2$—$Ta_2O_5$, $SiO_2$—$TiO_2$ and $SiO_2$—$ZrO_2$ system quartz glasses can form a GRIN lens having a high NA and a high controllability in the refractive index and a GRIN lens having the thermal expansion coefficient of $15\times10^{-7}K^{-1}$ or less, which is substantially equivalent to the quartz glass, with respect to the quartz thermal coefficient of $5\times10^{-7}K^{-1}$. However, the Sb-added glass was unstable in that the additive element Sb evaporates during sintering of the gel. Moreover, Zr-added glass was unstable in the process in which the hydrolysis reaction was relatively fast, and a small amount of precipitant is formed in the methanol solvent during the gel formation. From the result of this experiment, it was found that the GRIN lens having a high NA and a high controllability in the refractive index and having an thermal expansion coefficient substantially equivalent to that of the quartz glass can be formed from $SiO_2$—$Sb_2O_3$, $SiO_2$—$Ta_2O_5$, $SiO_2$—$TiO_2$ and $SiO_2$—$ZrO_2$ system quartz glass, more desirably $SiO_2$—$Ta_2O_5$ and $SiO_2$—$TiO_2$ system quartz glass considering the process stability.

The main component of the GRIN lens of the present invention includes the $SiO_2$—$Ta_2O_5$ and $SiO_2$—$TiO_2$ system quartz glasses. The GRIN lens and the optical fiber can be fused and spliced because both have almost equivalent thermal expansion coefficients. The optical fiber and the GRIN lens having almost the same cross-sectional shape are fused and spliced by using a flame of the oxygen/hydrogen burner. The center axes of the optical fiber and the GRIN lens coincide due to the self alignment effect of the surface tension balance, without requiring precise axis alignment which has been a pending problem to date. This has the advantage of greatly improving the assemble process. This fusion splicing technique is indispensable in improving the productivity. Not only does it reduce the light being reflected from the boundary face of an optical fiber and lens and returning to the semiconductor laser, but also it solves a problem of the optical property deterioration caused by alteration of the adhesive due to the elevated temperature when a highly intensive light is input by the optical absorption of the adhesive used in conventional adhesion methods.

Figure 5:
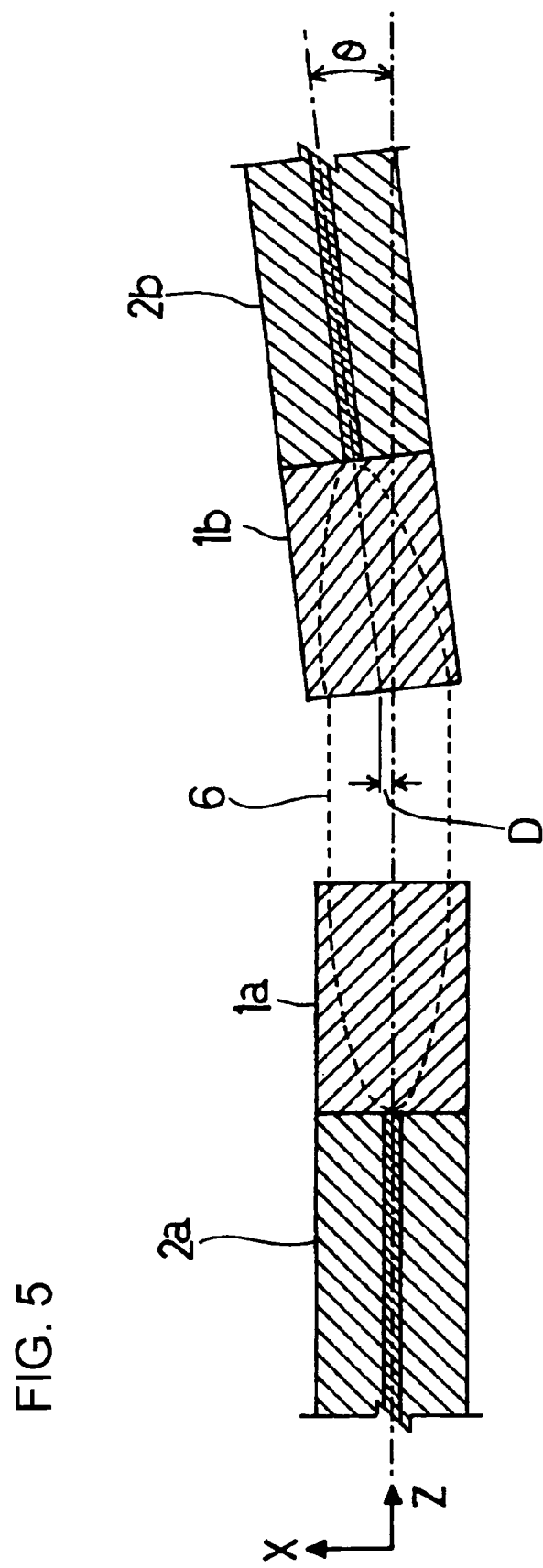
FIG. 5 is a XZ cross section of the collimator system.

FIG. 5 is the XZ cross section of the single core collimator system comprising the opposingly disposed GRIN lenses 1a and 1b which were fused and spliced to the optical fibers 2a and 2b. Typically axial displacements occur in various directions upon opposingly disposing the GRIN lens 1b with regard to the GRIN lens 1a. There occurs a displacement D (μm) in which the center axis of the GRIN lens 1b is displaced in the X direction from the ideal optical axis Z as shown in FIG. 5, and by an inclination angle θ (radian) to the X direction. A light propagating inside the core of the optical fiber 2a spreads due to the lens effect of the GRIN lens 1a, which is emitted from the end face of the GRIN lens 1a as a Gaussian beam 6 substantially parallel to the optical axis Z of the GRIN lens 1a. The parallel Gaussian beam 6 reaching the opposing GRIN lens 1b is converged by the lens effect of the GRIN lens 1b, and input to the core of the optical fiber 2b. When the outgoing light from the optical fiber 2a is input to the GRIN lens 1a which is fused and spliced to the optical fiber 2a, an electric field distribution of the basic wave propagating therein is approximately Gaussian distribution. The Gaussian distribution has a spot size ω defined in the following equation (4) near the end face of the GRIN lens 1a, when the length L of the GRIN lens 1a is the quarter of the meander cycle shown in the equation (3) (that is, when L=L¼).

$$\omega = 2/\omega_0 k n_0 g \quad (4)$$

Here, $\omega_0$ denotes a spot size of the electric field of the single mode optical fiber. If the single mode optical fiber has a cut-off frequency close to 2.4, and if the core radius of the optical fiber is $a_0$, then the spot size is given by $\omega_0=1.1a_0$ approximately. Moreover, a wave number k is given by $k=2\pi/\lambda$ wherein $\lambda$ is an optical wavelength.

As shown in FIG. 5, if there occurs the displacement D or the inclination angle θ to the X direction (horizontal direction), the parallel Gaussian beam 6 does not completely coincide with the basic wave propagating in the GRIN lens 1b. As a result, a part of the energy is not incorporated into the optical fiber to result in a coupling loss. The coupling loss T can be obtained by solving an overlap matrix of the electric field distribution of the basic wave of the GRIN lens 1b having the spot size ω defined in the equation (4) and the electric field distribution of the parallel Gaussian beam 6. The coupling loss is approximately defined in the following equation (5) in decibel.

$$T(\mathrm{db}) = 4.343\{(D/\omega)^2 + (kn_0\omega\theta/2)^2\} \quad (5)$$

Figure 6:
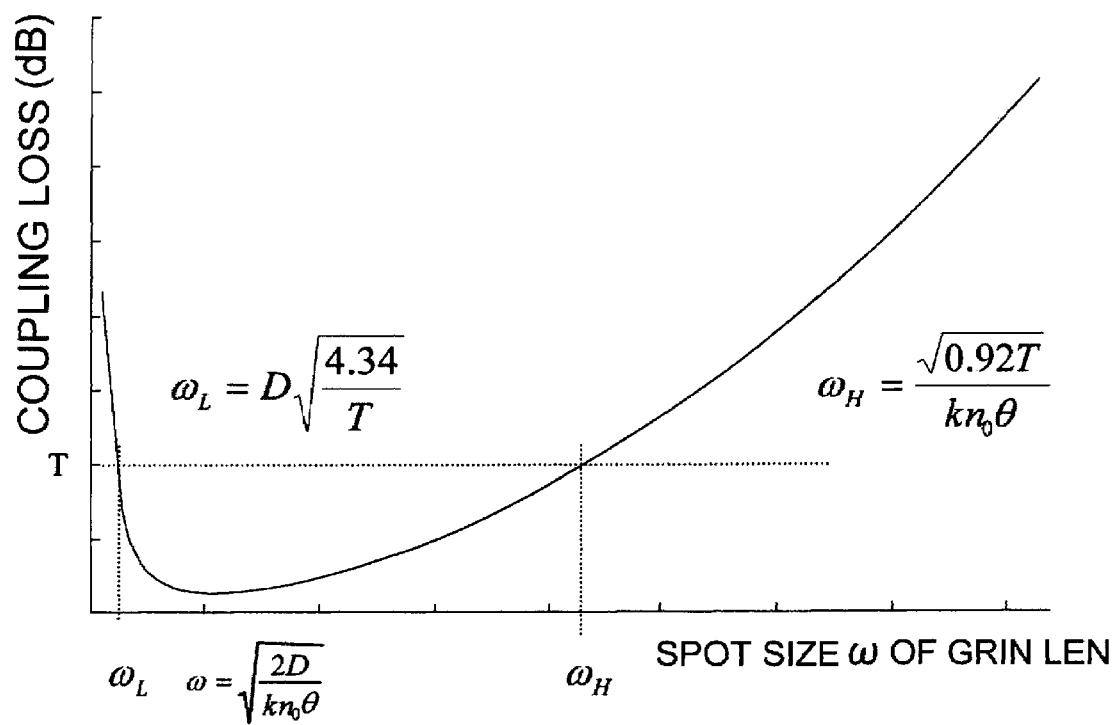
FIG. 6 is a relationship chart of a spot size ω of the GRIN lens and the coupling loss.

FIG. 6 is a graph plotting the coupling loss T in the vertical axis and the spot size ω of the GRIN lens in the horizontal axis, showing a qualitative relationship of the equation (5). The equation (5) is a function of ω. The graph shows a downwardly convex curve having a minimum value of $\omega = (2D/kn_0\theta)^{1/2}$. To reduce the coupling loss to no more than T(dB) shown in FIG. 6, the spot size ω of the GRIN lens may lie between the two spot sizes $\omega_L$ and $\omega_H$ of the GRIN lens on the graph intersecting the coupling loss T(dB). That is, the selection is made to satisfy the following equation (6).

$$\omega_L \approx D\sqrt{4.34/T} \leq \omega_H \leq \approx \sqrt{0.92T}/kn_0\theta \quad (6)$$

When equations (2) and (4) are substituted to the equation (6), as shown in the equation (7), the numerical aperture NA for the GRIN lens necessary to reduce the coupling loss to no more than T(dB) is obtained.

$$2\theta/\omega_0\sqrt{0.92T} \leq g = NA/n_0 a \leq \sqrt{0.92T}/\omega_0 kn0D \quad (7)$$

Figure 4:
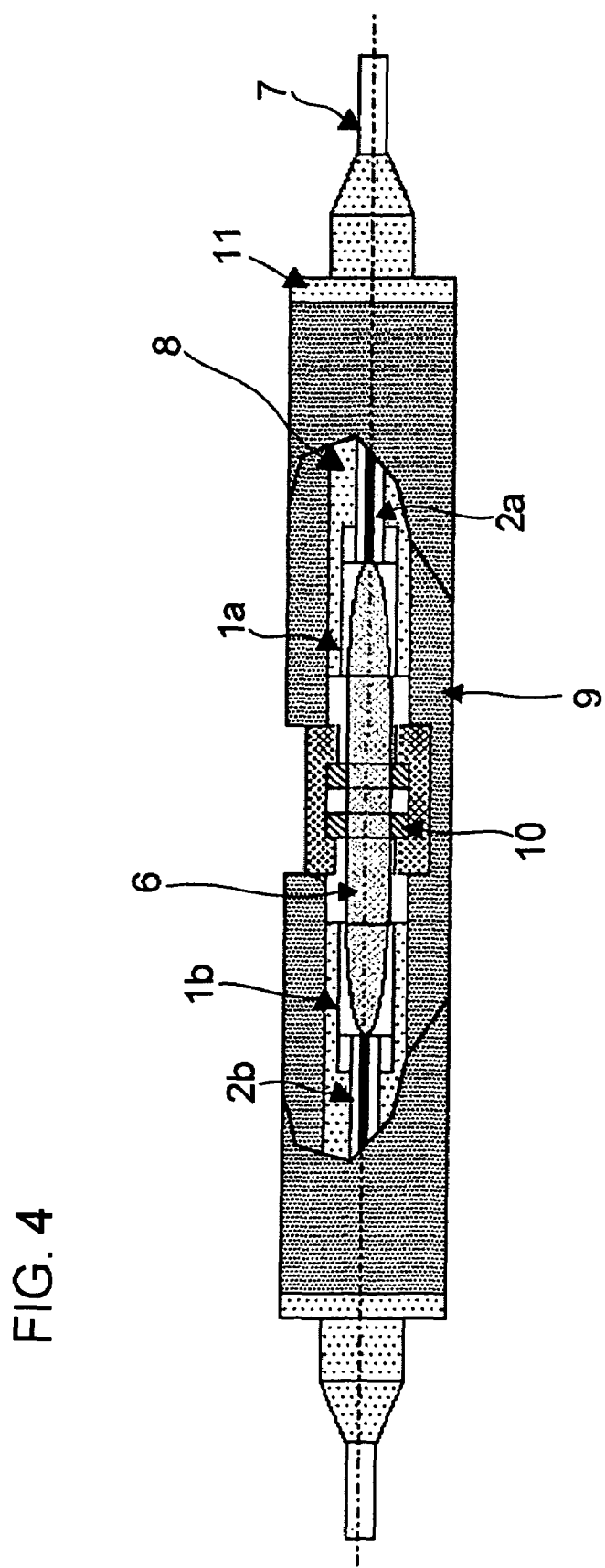
FIG. 4 is a partially broken side view of the collimator system.

According to the collimator system of FIG. 4 being utilized in the ordinary market, although the position displacement D can be suppressed down to a minimum as much as possible by improving the processing precision, the configuration lacks in the core alignment means of the inclination angle θ, and it is almost impossible to align the core to minimize inclination angle θ. For this reason, as shown in the equation (7), if the inclination angle θ gets larger, the numerical aperture NA of the GRIN lens must get larger. To facilitate the actual core alignment process, the GRIN lens must have a larger NA than the value obtained in equation (7).

Figure 8:
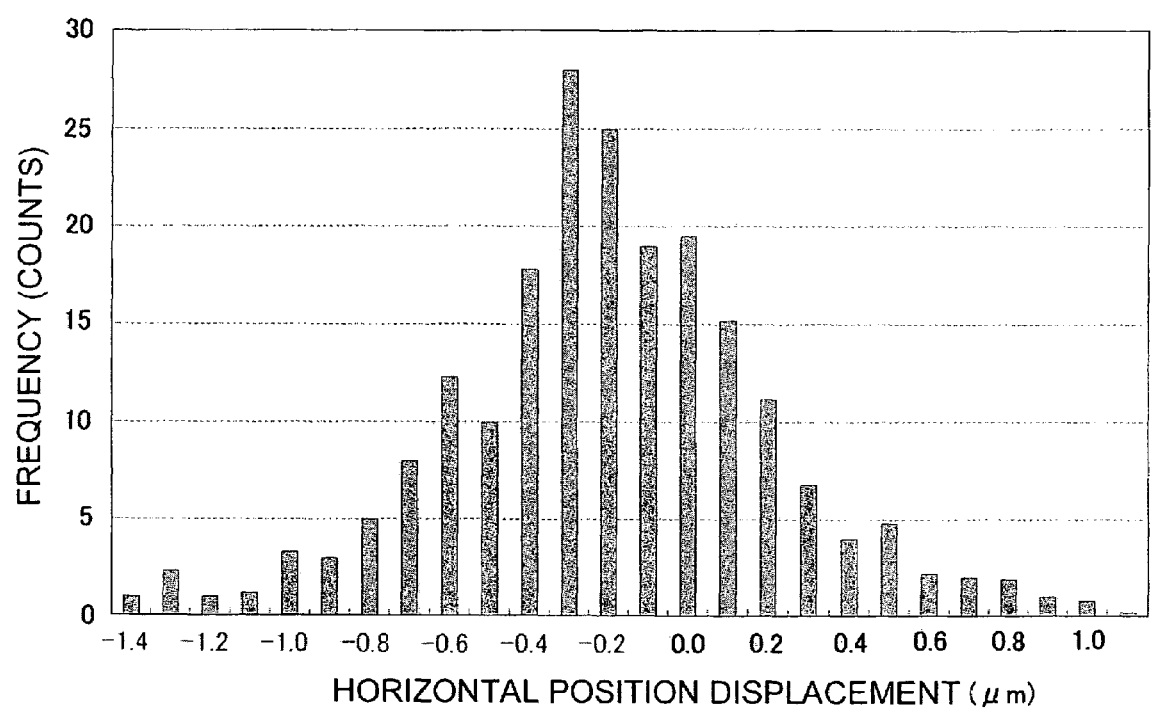
FIG. 8 is an explanatory drawing of the horizontal position displacements of the collimator system.
Figure 9:
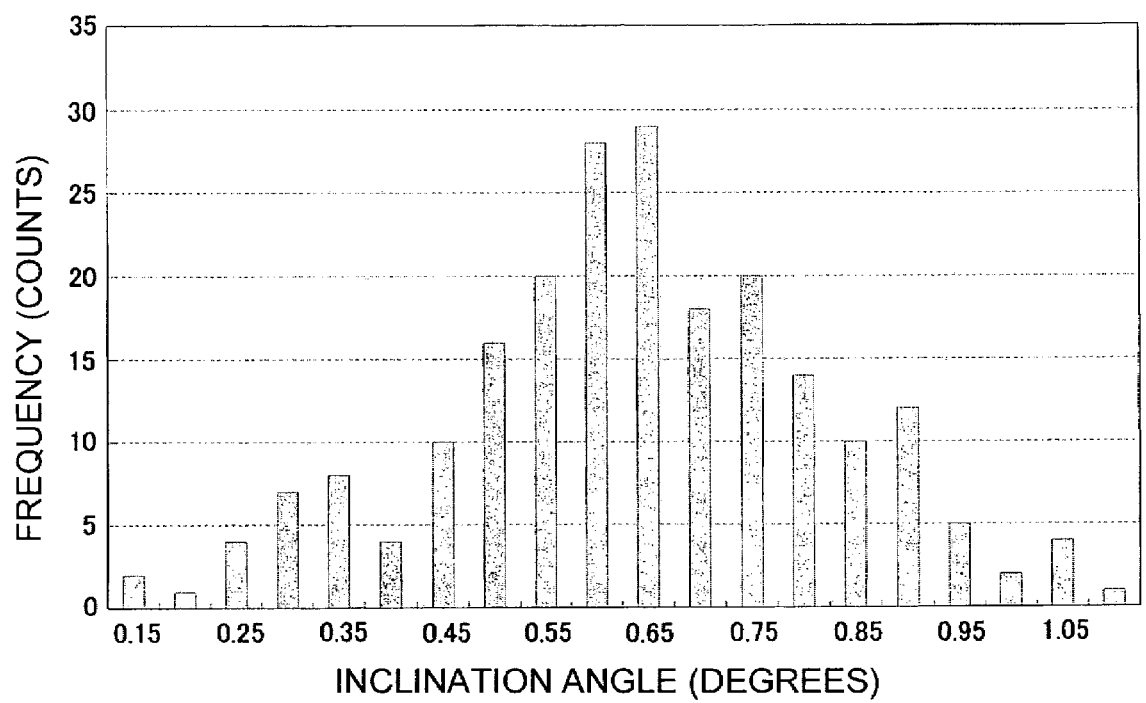
FIG. 9 is an explanatory drawing of the inclination angles of the collimator system.

For example, a number of collimator systems are trial-produced, their horizontal position displacements and the inclination angles are measured for a pair of the GRIN lenses facing each other, and the results shown in FIGS. 8 and 9 are assumed. Supposing that a targeted coupling loss for 90% or more of the fabricated collimator systems are suppressed under 1 dB, the horizontal position displacement D may be set to be 0.80 μm, and the inclination angle θ may be set to be 0.85 degrees (that is, 0.0148 radian) according to FIGS. 8 and 9. When these are substituted in the equation (7) and the radius of the GRIN lens is set to be 62.5 μm which is the same as the optical fiber (core diameter $a_0$=6.5 μm), it is found that the GRIN lens having NA=0.4 or more may be used at the wavelength of 1.5 μm.

Figure 12:
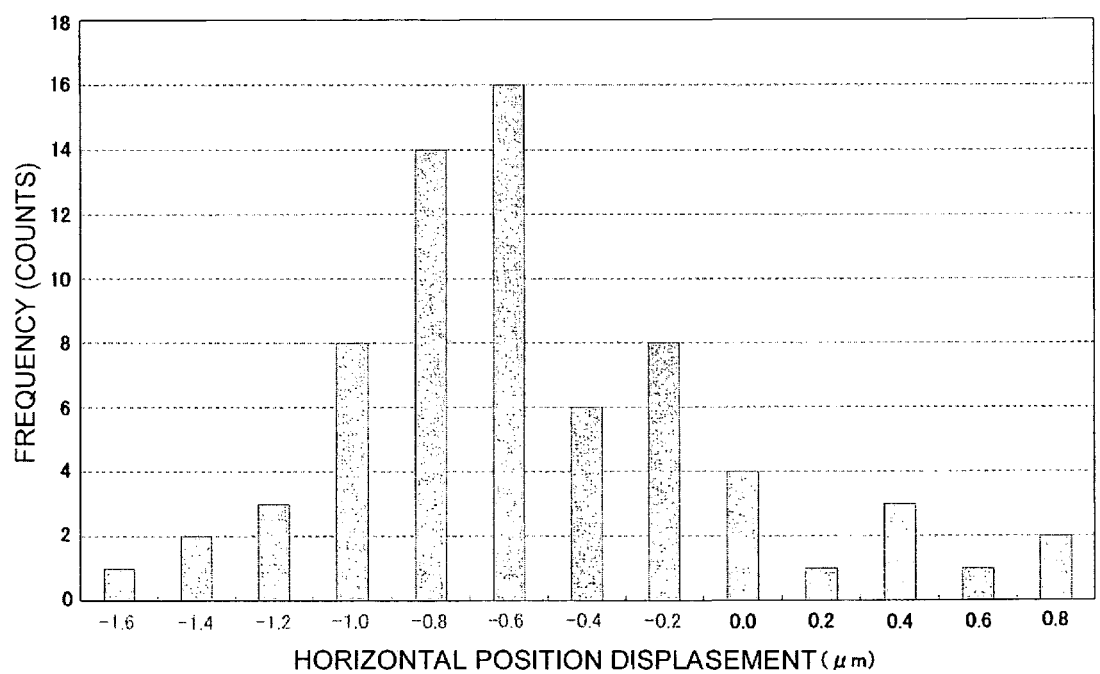
FIG. 12 is an explanatory drawing of the horizontal position displacements of the collimator array system.
Figure 13:
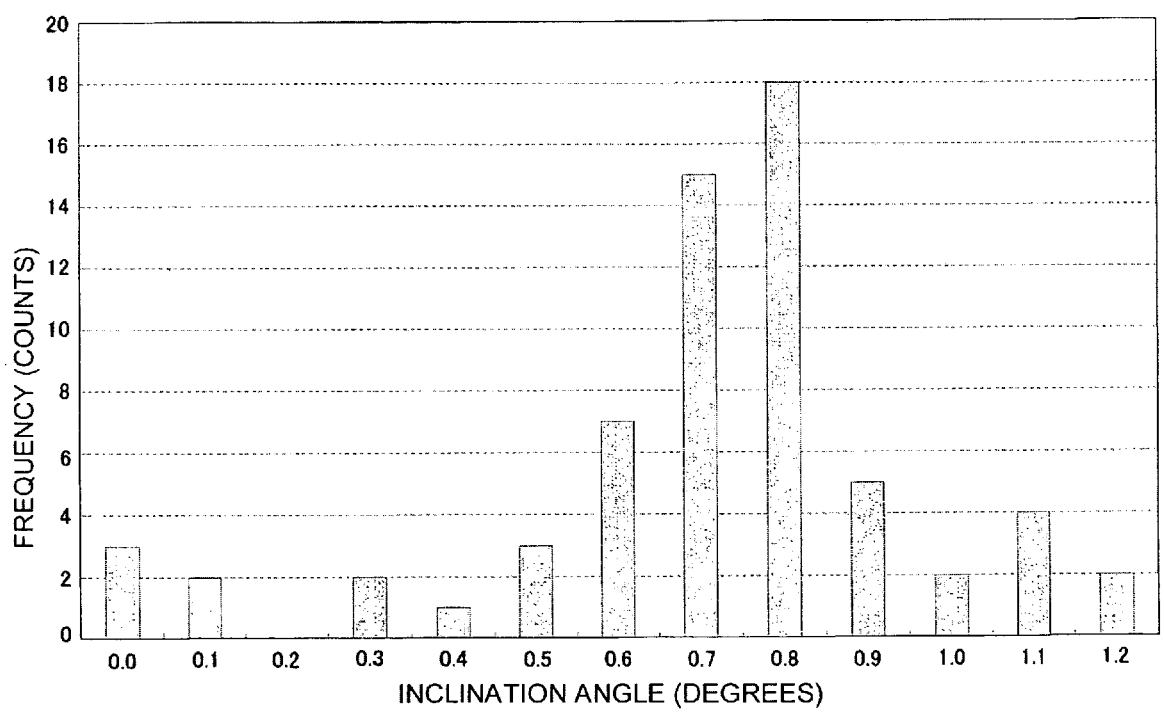
FIG. 13 is an explanatory drawing of the inclination angles of the collimator array system.

Moreover, for example, a number of collimator array systems are trial-produced, the horizontal position displacements and the inclination angles are measured for each pair of the GRIN lenses facing each other, and the results shown in FIGS. 12 and 13 are assumed. Supposing that a targeted coupling loss for 90% or more of the fabricated collimator systems are suppressed under 1 dB, the horizontal position displacement D may be set to 1.0 μm, and the inclination angle θ may be set to 1.0 degrees (that is, 0.0175 radian) according to FIGS. 12 and 13. When these are substituted in the equation (7), and the radius of the GRIN lens is set to be 62.5 μm, which is the same as the optical fiber (core diameter $a_0$=6.5 μm), the GRIN lens having NA=0.48 or more may be used, at the wavelength of 1.5 μm.

EMBODIMENT 1

Figure 7:
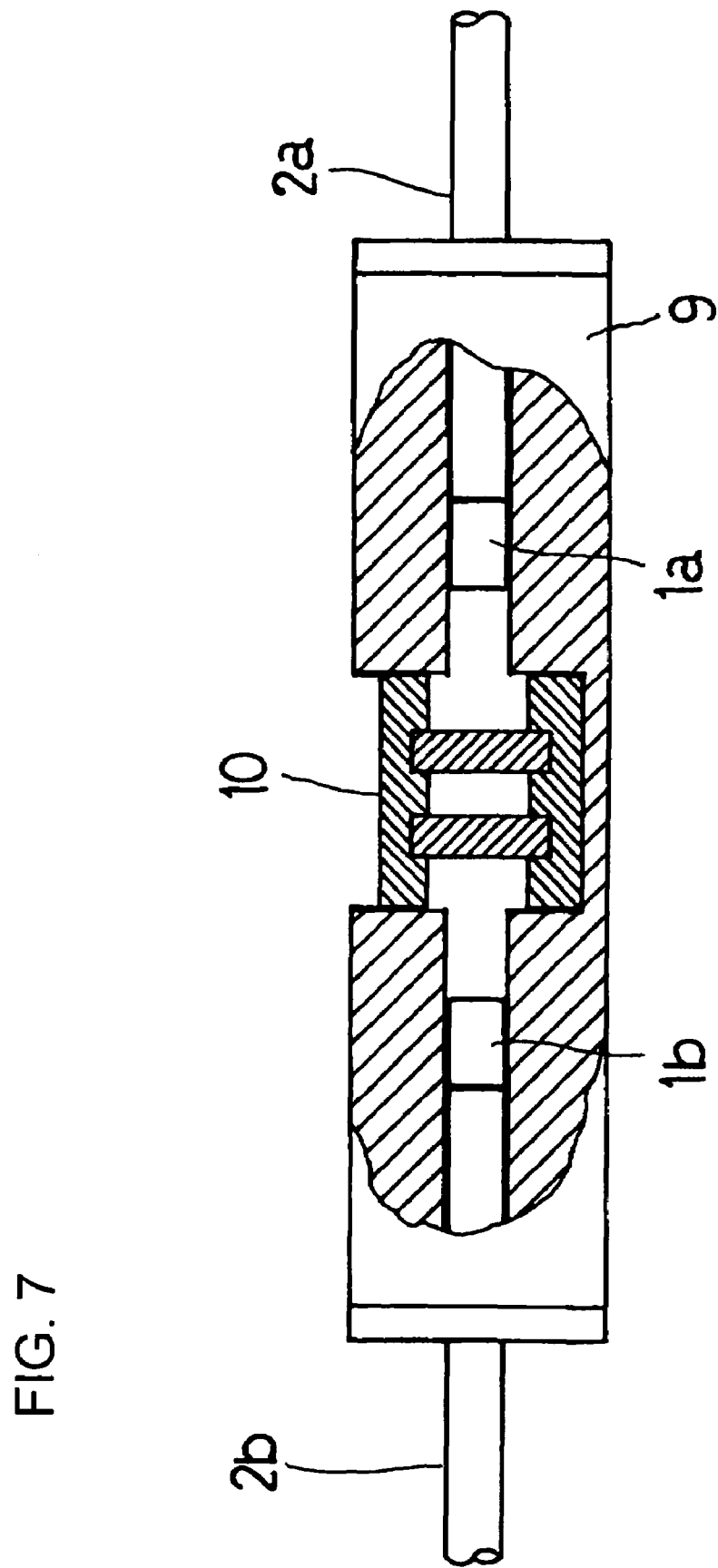
FIG. 7 is a partially broken side view of the collimator system.

FIG. 7 shows the fiber optic collimator system of the first embodiment. The optic fibers 2a and 2b with GRIN lenses 1a and 1b are inserted from both sides of the tubular collimator holder 9, and then adhered and fixed to attach the optical element 10 (in this case, the optical isolator) to the center. Approximately 230 sets of the collimator systems are carefully fabricated. The horizontal displacements (position displacement D) with regard to the X and Y directions and the inclination angles (angle displacement) θx and θy of the opposed GRIN lenses are measured. FIG. 8 shows the accumulative counts of the horizontal displacements in the X and Y directions (position displacements). FIG. 9 shows the accumulative counts of the inclination displacements with regard to the X and Y directions (angle displacements) θx and θy. FIGS. 8 and 9 show that the horizontal displacements are distributed with the peak of −0.3 μM and approximately ±1 μm width, and the inclination angle displacements are distributed with the peak of 0.65 degrees and approximately ±0.5 degrees width.

Upon fabricating the collimator system of the first embodiment, the coupling losses for 90% or more of the total assembly are suppressed to 1 dB or less as a target. The permitted horizontal displacement and the permitted inclination angle to achieve the target are obtained from FIGS. 8 and 9. The permitted horizontal displacement D is 0.80 μm and the permitted inclination angle θ is 0.85 degrees (that is, 0.0148 radian). These are substituted in the equation (7) to calculate the necessary NA. When the radius of the GRIN lens is set to be 62.5 μm, which is the same as the optical fiber (core diameter $a_0$=6.5 μm), the GRIN lens comes to have NA=0.48 at the wavelength of 1.5 μm. Thus, it is found that a GRIN lens having NA larger than 0.48 may be used.

Then, the optical fiber with a GRIN lens was produced. 75.5 ml of silicon tetra-methoxide and 183.4 ml of isopropanol are mixed, 9.2 ml of 2N hydrochloric acid is added to the mixture, after agitation for 30 minutes, 30.8 ml of titanium tetra-n-butoxide was further added. After that, 0.01N ammonium water was added and a wet gel was obtained. After aging the wet gel for 2 days at 50° C., the wet gel was further immersed into 3N hydrochloric acid for 6 hours to give a concentration distribution of titanium to the gel. After the immersion, the gel was immersed into methanol, the hydrochloric component inside the gel was washed and dried to obtain a dry gel of approximately 10 mm in diameter. The temperature of the obtained dry gel is elevated at a speed of 10° C. /hr starting from room temperature up to 350° C. After that, the temperature was elevated to 1200° C. and sintered, and a transparent glass was obtained accordingly. As the result of the refractive index distribution measurement for this cylindrical glass, a parent material of the GRIN glass having NA=0.42 with decreasing refractive index from the core to the periphery in the squared curve approximately was obtained. It was found that this parent material can be utilized because the NA is larger than the NA=0.4 obtained from the equation (7).

While the parent material was inserted into an electric furnace of the carbon heater at 0.04 mm/s, it was spun into an optical fiber having an outer dimension of 125 μm, and a GRIN lens shaped optical fiber was produced. The produced GRIN lens shaped optical fiber is fused and spliced to one end of a single mode optical fiber with the core diameter of 6.5 μm by using an electrical discharge fusion splicer. After that, the optical fiber with a GRIN lens was obtained by cutting the GRIN lens to a cycle length of 350 μm which is a quarter of the meander cycle of a light propagating in the GRIN lens.

By using the optical fiber with a GRIN lens obtained accordingly, 90 pieces of collimator systems of FIG. 7 were produced, and the coupling losses of all the pieces were measured. In approximately 95% of the collimator systems, the high coupling efficiency showing coupling losses of 1 dB or less was obtained.

EMBODIMENT 2

Figure 3:
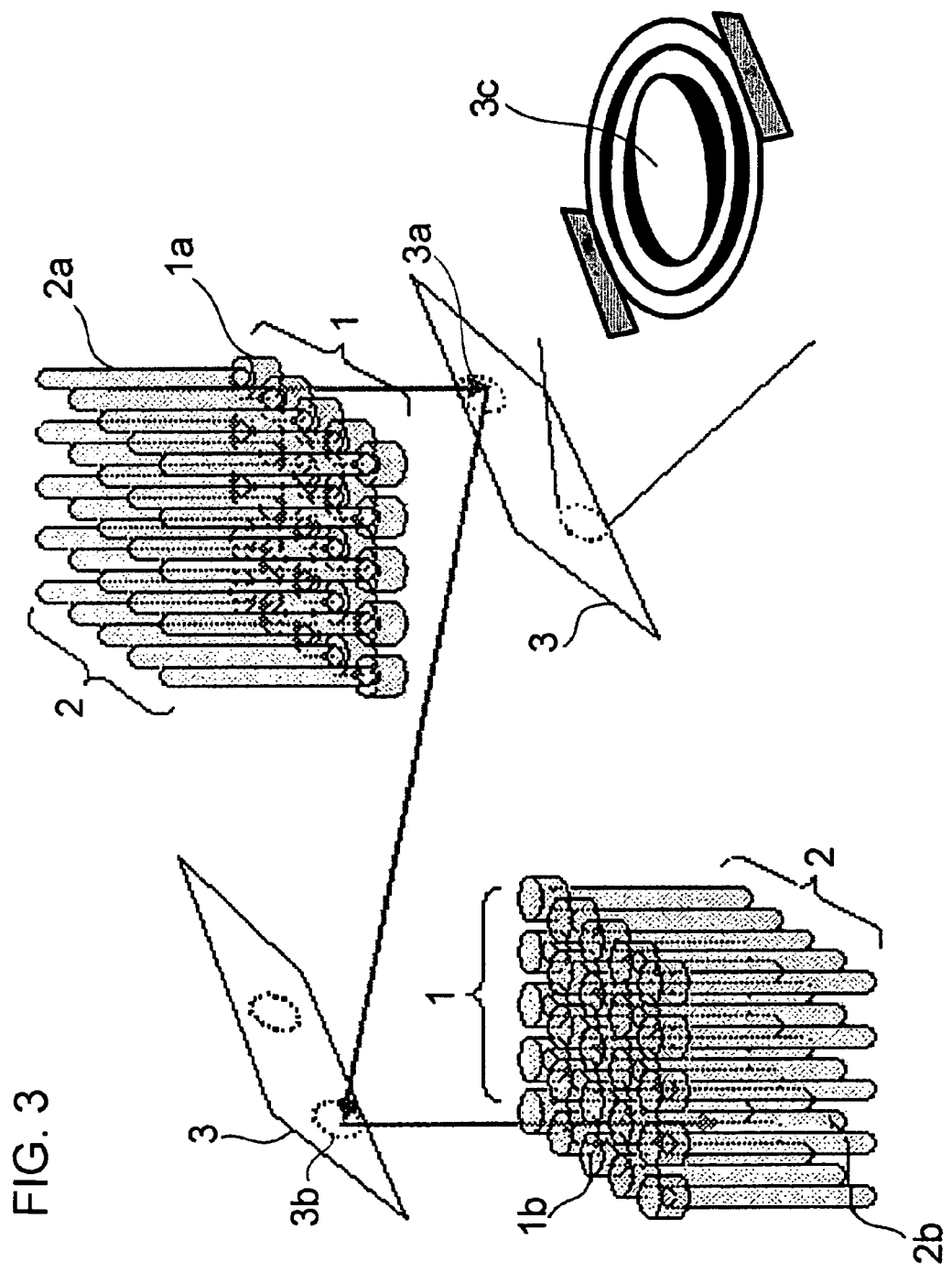
FIG. 3 is a schematic perspective and explanatory drawing of the collimator array system.
Figure 10:
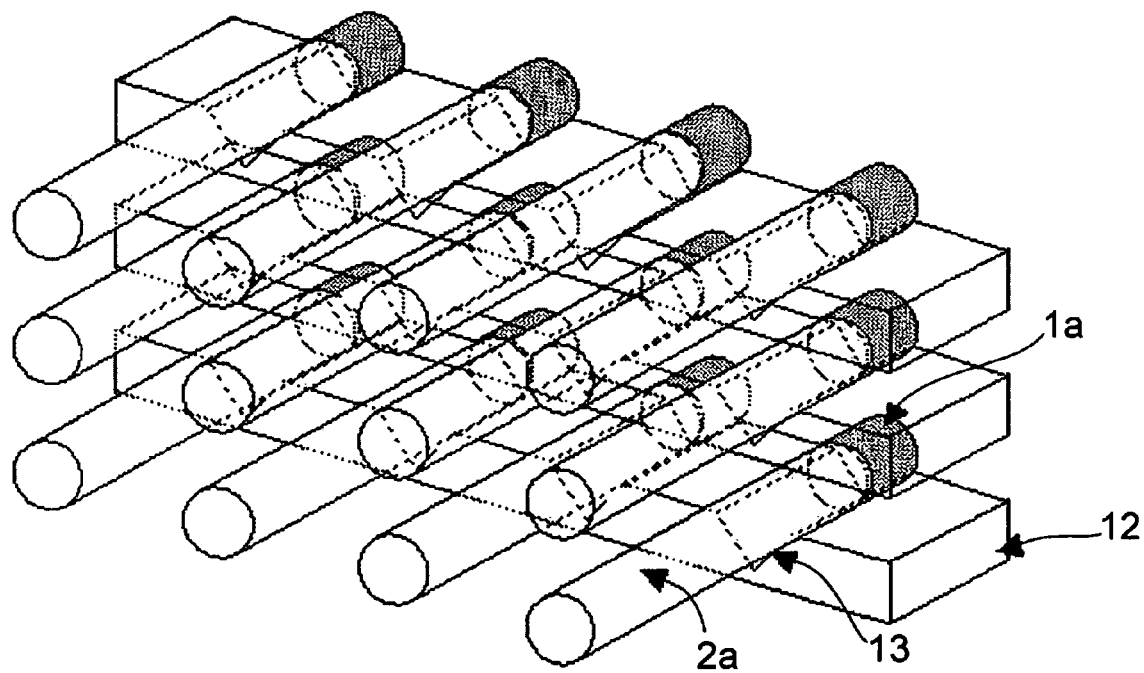
FIG. 10 is a perspective and explanatory drawing of the collimator array.
Figure 11:
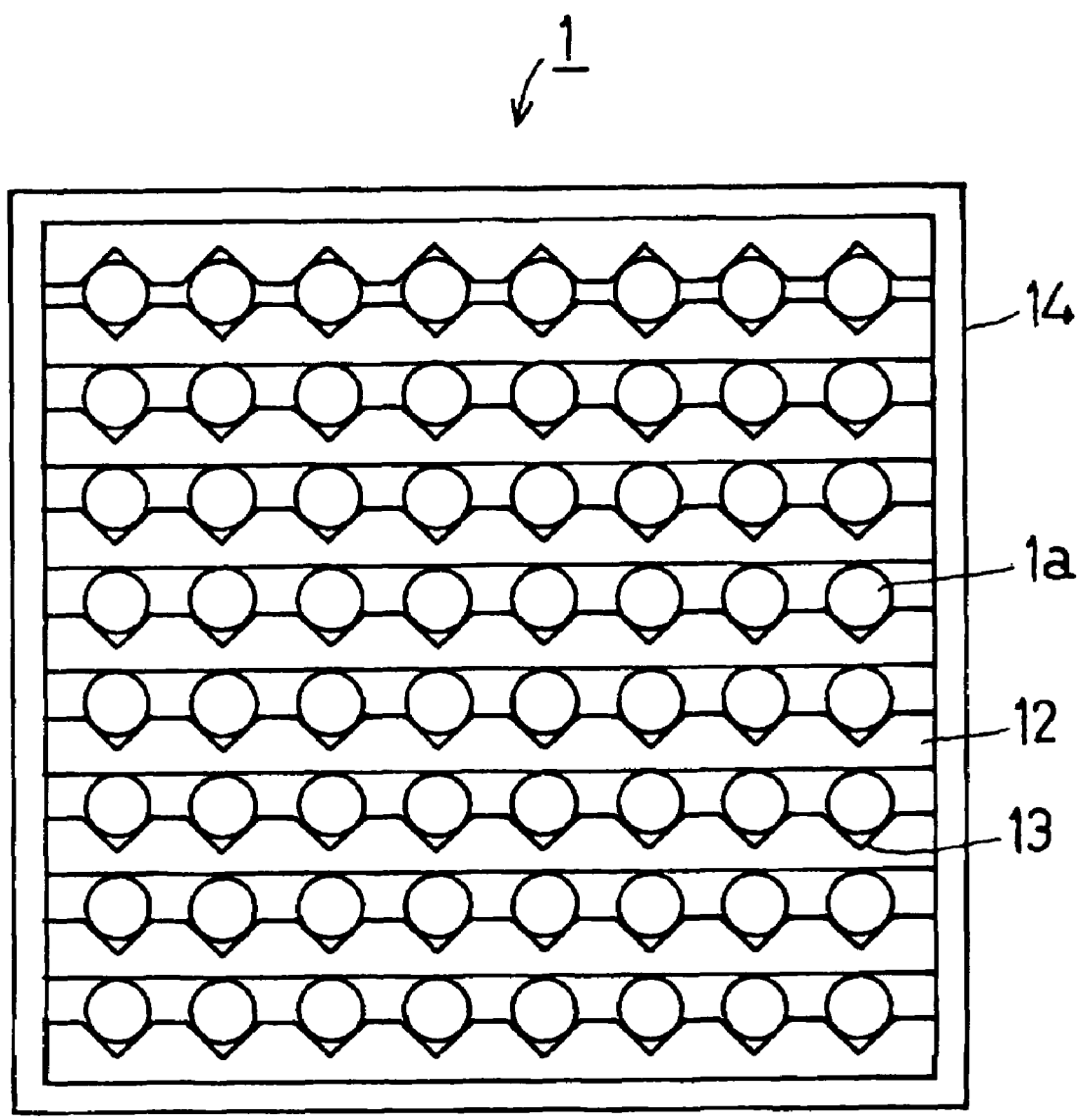
FIG. 11 is a front view of the collimator array.

FIGS. 10 and 11 relate to the optical fiber collimator arrays of the second embodiment. The end portions of the GRIN lens attaching to the optical fiber are regularly arranged in eight (8) rows along periodic V-grooves 13 formed by chemical etching on the $SiO_2$ board 12. Further, these are regularly laminated in eight (8) steps, fixed to a frame 14, and thereby 8×8 GRIN lens collimator arrays were produced. Using this collimator array, a set of optical fiber collimator arrays, into which two MEMS-type optical switch arrays 3 with 2 degrees of freedom shown in FIG. 3 are inserted, were carefully fabricated. The horizontal displacements in the X and Y directions (position displacement D) and the inclination angles (angle displacement) θx and θy were measured for each pair of the opposing GRIN lens. FIG. 12 shows the accumulative counts of the horizontal displacements in the X and Y directions (position displacement). FIG. 13 shows the accumulative counts of the inclination angles (angle displacement) θx and θy. The horizontal direction displacement distribution is unsymmetrical, with a peak of 0.6 μm. The inclination angle displacement distribution in unsymmetrical, with a peak of 0.8 degrees.

To fabricate the collimator array system of the second embodiment, the coupling loss is targeted to be suppressed up to 1 dB or less in 90% or more of the total number of the GRIN lens pairs. The permitted horizontal position displacement and the permitted inclination angle to achieve the target are measured from FIGS. 12 and 13, the horizontal position displacement D resulted in 1.0 μm, and the inclination angle θ resulted in 1.0 degrees (that is, 0.0175 radian). These are substituted in the equation (7) to calculate the necessary NA. When the radius of the GRIN lens is set to be 62.5 μm (core diameter $a_0$=6.5 μm), the GRIN lens comes to have NA=0.48 at the wavelength of 1.5 μm, and it was found that the GRIN lens having NA larger than 0.48 may be used.

Subsequently, the optical fiber with a GRIN lens was produced. 75.5 ml of silicon tetra-methoxide and 183.4 ml of isopropanol were mixed, 9.2 ml of 2N hydrochloric acid was added to the mixture, and after agitating the mixture for 30 minutes, 30.8 ml of titanium tetra-n-butoxide was further added. After that, 0.01N ammonium water was added and a wet gel was obtained. After aging the wet gel for 2 days at 50° C., the wet gel was further immersed into 6N hydrochloric acid for 2 hours to give a concentration distribution of titanium to the gel. After the immersion, the gel was immersed into methanol, and the hydrochloric component inside the gel was washed. After that, the gel was immersed into 6N hydrochloric acid for 20 minutes, and the second concentration distribution is given in the same manner as the first time, by immersing the gel into methanol, washing with the hydrochloric acid, and drying. After that, the gel was immersed into 6N hydrochloric acid for 8 minutes, and the third concentration distribution was given in the same manner as the first time, by immersing the gel into methanol, washing with the hydrochloric acid, and drying to obtain a dry gel of approximately 10 mm in diameter. The temperature of the obtained dry gel was elevated at a speed of 10° C./hr starting from room temperature up to 350° C. After that, the temperature was elevated to 1200° C. and sintered, and a transparent glass was obtained accordingly. As the result of the refractive index distribution measurement for this cylindrical glass, a parent material of the GRIN glass of N=0.5 with decreasing refractive index from the core to the periphery in the squared curve approximately was obtained. It was found that this parent material can be utilized because the NA is larger than the NA=0.48 obtained from the equation (7).

While the parent material was inserted into an electric furnace of the carbon heater at 0.04 mm/s, it was spun into an optical fiber having the outer dimension of 125 μm, and a GRIN lens shaped optical fiber was produced. The produced GRIN lens shaped optical fiber was fused and spliced to one end of a single mode optical fiber with the core radius of 6.5 μm by using the electrical discharge fusion splicer. After that, an optical fiber with a GRIN lens was obtained by cutting the GRIN lens to a cycle length of 295 μm which is a quarter of the meander cycle of a light propagating in the GRIN lens.

By using the obtained optical fiber with a GRIN lens, the optical fiber collimator array system of FIG. 11 was fabricated, and further, the optical fiber collimator array system of FIG. 3 was produced. The coupling losses of all channels are measured, and the high coupling efficiency in which the coupling losses are 1 dB or less were obtained for all of the channels (pairs of optical fibers with GRIN lenses).

The above embodiments were exemplified as a case of $SiO_2$—$TiO_2$ system quartz glass. As other examples, to obtain the $SiO_2$—$Ta_2O_5$ system quartz glass, tantalum ethoxide may be used in replace of titanium tetra-n-butoxide. Triethyl antimony may be used to make $SiO_2$—$Sb_2O_3$ system quartz glass. Zirconium propoxide may be used to make $SiO_2$—$ZrO_2$ system quartz glass.

The invention claimed is:

1. A method of manufacturing a fiber optic collimator system including a first GRIN lens (Graded Index Lens) made of quartz glass containing a refractive index regulating substance formed of at least one material selected from the group consisting of $Sb_2O_3$, $Ta_2O_5$, $TiO_2$ and $ZrO_2$, a first optical fiber fused to a first end of the first GRIN lens, a second GRIN lens made of quartz glass containing a refractive index regulating substance formed of at least one material selected from the group consisting of $Sb_2O_3$, $Ta_2O_5$, $TiO_2$ and $ZrO_2$, and a second optical fiber fused to a first end of the second GRIN lens, wherein the first and second GRIN lenses are aligned so as to oppose one another and an optical element is disposed between the opposing ends of the first and second GRIN lenses, said method comprising:

trial-producing a plurality of optical fiber collimator systems;

measuring a horizontal position displacement and an inclination angle for the first and second GRIN lenses of the trial-produced optical fiber collimator systems;

setting a targeted yield and a targeted coupling loss;

checking the horizontal position displacement and the inclination angle against the targeted yield to obtain a permitted horizontal position displacement and a permitted inclination angle;

calculating a numerical aperture of a GRIN lens based on the permitted horizontal position displacement and the permitted inclination angle; and producing the optical fiber collimator system by using a GRIN lens having a numerical aperture that is equal to or larger than the calculated numerical aperture for at least one of the first and second GRIN lenses.

2. A method of manufacturing a fiber optic collimator system including a first GRIN lens (Graded Index Lens) made of quartz glass containing a refractive index regulating substance formed of at least one material selected from the group consisting of $Ta_2O_5$ and $TiO_2$, a first optical fiber fused to a first end of the first GRIN lens, a second GRIN lens made of quartz glass containing a refractive index regulating substance formed of at least one material selected from the group consisting of $Ta_2O_5$ and $TiO_2$, a second optical fiber fused to a first end of the second GRIN lens, wherein the first and second GRIN lenses are aligned so as to oppose one another and an optical element is disposed between the opposing ends of the first and second GRIN lenses, said method comprising:

trial-producing a plurality of optical fiber collimator systems;

measuring a horizontal position displacement and an inclination angle for the first and second GRIN lenses of the trial-produced optical fiber collimator systems;

setting a targeted yield and a targeted coupling loss;

checking the horizontal position displacement and the inclination angle against the targeted yield to obtain a permitted horizontal position displacement and a permitted inclination angle;

calculating a numerical aperture of a GRIN lens based on the permitted horizontal position displacement and the permitted inclination angle; and producing the optical fiber collimator system by using a GRIN lens, for at least one of the first and second GRIN lenses, having a numerical aperture that is equal to or larger than the calculated numerical aperture.

3. A method of manufacturing a fiber optic collimator array system including a pair of optical fiber collimator arrays that are directly opposed or disposed opposingly via a mirror, each of the fiber optic collimator arrays includes a plurality of optical fibers and a plurality of GRIN (Graded Index Lens) lenses fused to an end of the optical fibers, respectively, wherein the optical fibers with the GRIN lenses are integrated by aligning the GRIN lenses in parallel and each of the GRIN lenses is made of quartz glass containing a refractive index regulating substance formed of at least one material selected from the group consisting of $Sb_2O_3$, $Ta_2O_5$, $TiO_2$ and $ZrO_2$, said method comprising:

trial-producing a plurality of optical fiber collimator array systems;

measuring a horizontal position displacement and an inclination angle for each respective GRIN lens of the trial-produced optical fiber collimator array systems;

setting a targeted yield and a targeted coupling loss;

checking the horizontal position displacement and the inclination angle against the targeted yield to obtain a permitted horizontal position displacement and a permitted inclination angle;

calculating a numerical aperture of a GRIN lens based on the permitted horizontal position displacement and the permitted inclination angle; and producing the optical fiber collimator array system by using GRIN lenses each having a numerical aperture that is equal to or larger than the calculated numerical aperture.

4. The method of manufacturing a fiber optic collimator array system according to claim 3, wherein each of the GRIN lenses is made of quartz glass containing a refractive index regulating substance formed of at least one material selected from the group consisting of $Ta_2O_5$ and $TiO_2$.

* * * * *